(12) United States Patent
Handshaw et al.

(10) Patent No.: US 12,394,338 B2
(45) Date of Patent: Aug. 19, 2025

(54) METHOD TO USE A SINGLE CAMERA FOR BARCODING AND VISION

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/526,375

(22) Filed: Dec. 1, 2023

(65) Prior Publication Data
US 2025/0182651 A1    Jun. 5, 2025

(51) Int. Cl.
| | | |
|---|---|---|
| G06V 40/16 | (2022.01) | |
| G06V 30/14 | (2022.01) | |
| G09F 3/00 | (2006.01) | |
| G09F 3/02 | (2006.01) | |

(52) U.S. Cl.
CPC ........ *G09F 3/0297* (2013.01); *G06V 30/1431* (2022.01); *G06V 30/1437* (2022.01); *G06V 30/1448* (2022.01); *G06V 40/161* (2022.01); *G06V 2201/07* (2022.01); *G09F 2003/0208* (2013.01)

(58) Field of Classification Search
CPC ............... G09F 3/0297; G06V 40/161; G06V 30/1437; G06V 30/1431; G06V 30/1448; G06K 7/10722

USPC .............. 235/454, 439, 435, 462.11, 462.24, 235/462.32
See application file for complete search history.

(56) References Cited

U.S. PATENT DOCUMENTS

| | | | |
|---|---|---|---|
| 2013/0092735 A1* | 4/2013 | Liu .................... | G06K 7/1096 235/440 |
| 2018/0012080 A1 | 1/2018 | Glaser et al. | |
| 2018/0241922 A1* | 8/2018 | Baldwin ............... | H04N 23/45 |
| 2020/0014848 A1 | 1/2020 | Gove | |

OTHER PUBLICATIONS

International Search Report and Written Opinion for International Application No. PCT/US2024/057073 mailed on Jan. 24, 2025.

* cited by examiner

*Primary Examiner* — Edwyn Labaze
(74) *Attorney, Agent, or Firm* — Yuri Astvatsaturov

(57) ABSTRACT

Systems and methods for performing barcoding and machine vision with a single camera are disclosed herein. An example system includes an image sensor configured to capture low-resolution image data of a large field of view and high-resolution image data of a small field of view. A first data pipeline is configured to transmit the low-resolution image data to a first module configured to perform image processing on the low-resolution image data. A second data pipeline is configured to transmit the high-resolution image data to a second module configured to perform image processing on the high-resolution image data. Machine readable instructions cause the system to capture image data of the large field of view or the small field of view and the processor transmits either the low-resolution image data via the first data pipeline or the high-resolution image data via the second pipeline.

17 Claims, 8 Drawing Sheets

METHOD TO USE A SINGLE CAMERA FOR BARCODING AND VISION

BACKGROUND

There are two imaging-based data capture modalities used in retail and logistics environments. Barcode and indicia decoding systems provide a means for identifying and tracking objects, as well as obtaining or accessing information associated with a specific barcode or indicia. Machine vision systems provide a means for further identifying objects, identifying or tracking groups of objects, spatially tracking objects, shape recognition, performing scan avoidance, and detecting ticket switching among other applications. Current systems require that a barcode imager and a vision camera be separated due to the different fields of view and resolutions required to efficiently perform each independent process. Additionally, the different types of sensors required for the different uses and applications can vary greatly in cost as well as vary in the overall pixels per module required to perform the various indicia decoding and vision tasks.

Due to the different resolution, field of view, and spatial requirements for each of indicia decoding and machine vision processes, current systems require that the sensor for performing indicia decoding be independent and separate from a sensor for performing machine vision. As such, a multiple sensor system for performing indicia decoding and machine vision can be more expensive, and require additional optical, electrical, and physical components to operate and mount the independent imaging sensors. The additional components also require more real estate with specific mounting positions to achieve desired fields of view which can result in bulky systems that may not be feasible for implementing in some applications and environments. Further, the additional sensors and components add additional potential points of failure as well as require additional setup time and tuning.

Accordingly, there remains a demand for improvements to barcode and indicia scanning systems that are also capable of performing machine vision processes.

SUMMARY

In an embodiment, the present invention is an image-based data capture system. The system includes an image processing assembly configured to capture (i) first image data over a first field of view of the image sensor with the first image data having a first resolution and (ii) second image data of a second field of view of the image sensor, the first field of view being larger than the second field of view, and the first resolution having a lower resolution density than the second resolution; a first data pipeline configured to transmit the first image data from the image sensor to a first module configured to perform image processing on the first image data; a second data pipeline configured to transmit the second image data from the image sensor to a second module configured to perform image processing on the second image data; and a processor and computer-readable media storage having machine readable instructions stored thereon that, when the machine readable instructions are executed, cause the system to: capture, via the image sensor, image data of either of the first field of view or of the second field of view of the image sensor; and responsive to capturing image data, transmit either the first image data via the first data pipeline to the first module or the second image data via the second data pipeline to the second module.

In a variation of the current embodiment, the image processing assembly is further configured to capture high-resolution image data of the first field of view, and wherein the computer-readable media further cause the system to: generate, by the processor, high-resolution image data of the second field of view from the high-resolution image data of the first field of view; and transmit, by the processor, the generated high-resolution image data of the small field of view via the second data pipeline to the second module.

In variations of the current embodiment, the second module is configured to perform indicia decoding on the second image data. Additionally, in variants of the current embodiment, the first module is configured to perform optical character recognition on the high-resolution image data.

In more variants of the current embodiment, the first module is configured to perform non-barcode decoding machine vision operation processes on the first image data. In additional variants of the current embodiment, the first module is configured to perform object detection, object recognition, or facial recognition on the low-resolution image data.

In another embodiment, the present invention in a method for performing single camera indicia decoding and machine vision processes. The method includes capturing, via an imaging sensor, first image data of a first field of view of the imaging sensor or second image data of a second field of view of the imaging sensor, the second field of view being a subset of the first field of view, and the first image data having a lower resolution density than the second image data; and transmitting, by a processor, either of (i) the first image data of the first field of view via a first data pipeline to a first module, or (ii) the second image data of the second field of view via a second data pipeline to a second module.

In variants of the current embodiment, the method further includes capturing high-resolution image data of the first field of view; generating high-resolution image data of the second field of view from the high-resolution image data of the first field of view; and transmitting the generated high-resolution image data of the second field of view via the second data pipeline to the second module.

In additional variations of the current embodiment, the second module is configured to perform indicia decoding. In variants of the current embodiment, the second module is configured to perform optical character recognition.

In yet more variants of the current embodiment, the first module is configured to perform non-barcode decoding machine vision operation processes. In additional variants of the current embodiment, the first module is configured to perform object detection, object recognition, or facial recognition.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1C is a front schematic block diagram view of an example system of FIG. 1A.

Figure 1A:
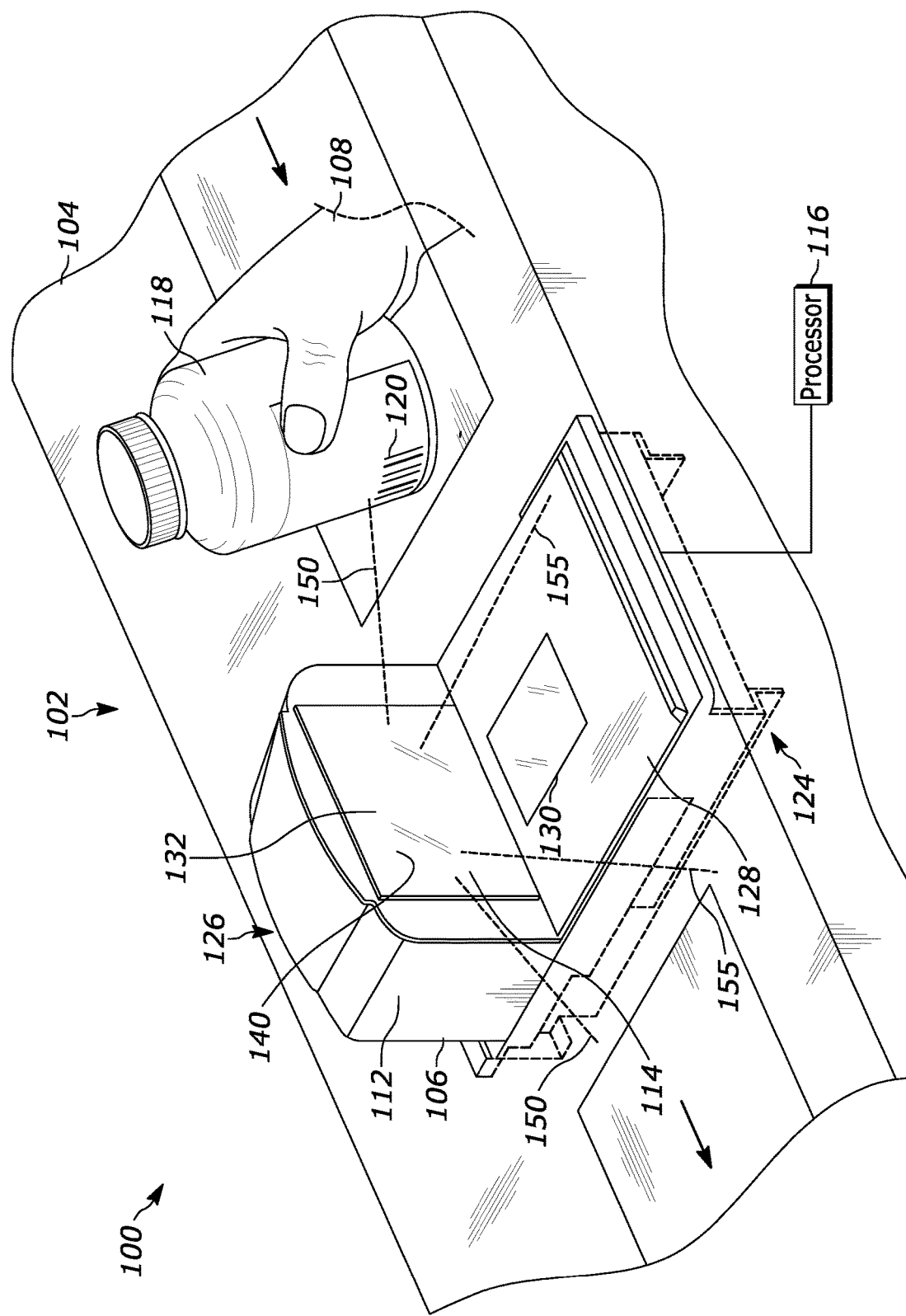
FIG. 1A illustrates a perspective view of an example indicia decoding and machine vision system in accordance with the teachings of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1B:
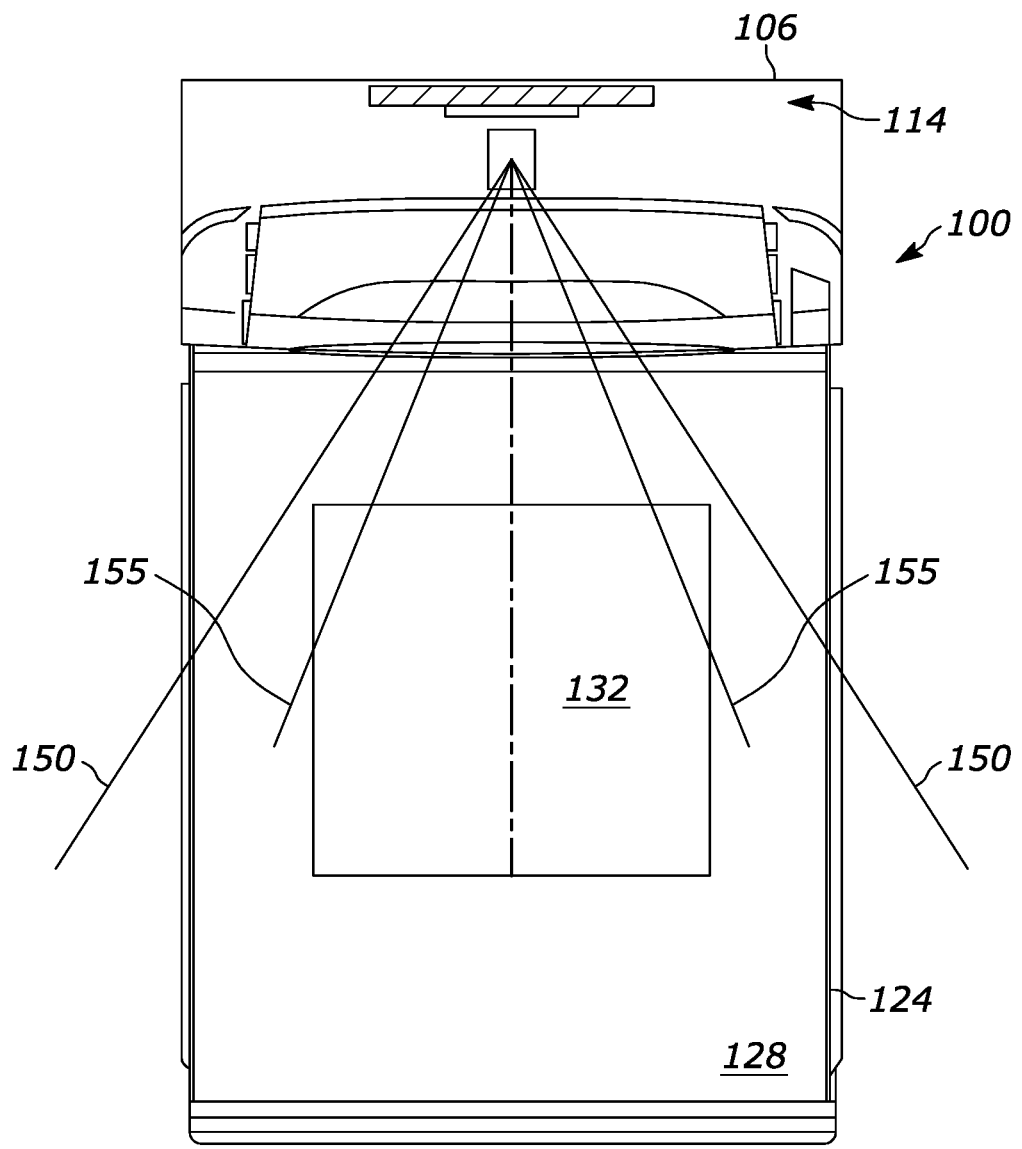
FIG. 1B is a front schematic block diagram view of an example system of FIG. 1A.

The disclosed systems and methods enable performing barcoding and machine vision processes using a single camera. The single camera systems allows for the reduction of electrical, mechanical, and optical components which reduces overall system size, cost, and power use. As described herein, the system utilizes two different fields of view and transmits either high-resolution image data or low-resolution image data via a respective high-resolution data pipeline or low-resolution image data pipeline. Each pipeline transmits the high or low-resolution image data to either a module for performing barcoding and indicia decoding, or for performing machine vision processes. The systems and methods allow for efficient capturing and transmission of required high or low-resolution image data and simultaneous of FIG. 1A illustrates a perspective view of an example point-of-sale (POS) system 100, for reading barcodes, decoding indicia, and performing machine vision processes, in accordance with the teachings of this disclosure. FIG. 1B is a top down view and a of the example system of FIG. 1A. In the example shown, the system 100 includes a workstation 102 with a counter 104 and a bi-optical (also referred to as "bi-optic") imager 106. The bi-optic imager 106 may also be referred to as a bi-optic scanner or an indicia reader. The POS system 100 is often managed by a store employee such as a clerk 108. However, in other cases, the POS system 100 may be part of a so-called self-checkout lane where instead of a clerk, a customer is responsible for checking out his or her own products.

The bi-optic imager 106 includes a housing 112 that houses an optical imaging assembly 114. The optical imaging assembly 114 includes one or more image sensors and is communicatively coupled to a processor 116. The image sensors may include one or more color cameras, one or more monochrome imagers, one or more infrared cameras or sensors, one or more optical character readers, etc. The processor 116 may be disposed within the bi-optic imager 106 or may be in another location. In specific examples described herein, the optical imaging assembly 114 includes a single camera for performing both indicia decoding and machine vision processes.

The optical imaging assembly 114 includes one or more fields of view (FsOV) including a large field of view (FOV) 150, and a small FOV 155. The one or more image sensors are configured to obtain low-resolution image data of the large FOV 150, and to obtain high-resolution image data of the small FOV 155. In examples, the one or more image sensors may captures high-resolution image data of the large FOV 150, and a processor may then perform image transforms and image processing to generate a high-resolution image of the small FOV 155 from the image data of the large FOV 150. The high-resolution image data of the small FOV 155 may be used to perform barcode or other indicia decoding, and the low-resolution image data of the large FOV 150 may be used to perform machine vision processes.

The optical imaging assembly 114 may further include one or more illumination sources 140. The illumination source(s) 140 may include on or more LEDs, white light sources, or another illumination source for providing illumination to a target. The one or more illumination sources 140 provide illumination to the large FOV 150 and to the small FOV 155. In examples, the optical imaging assembly 114 may alternate between obtaining images of the large FOV 150 and the small FOV 155. In such implementations the one or more illumination sources 140 may be configured to provide alternating illumination to the large FOV 150 and the small FOV 155 according to the alternating OFV image captures. The illumination sources 140 may utilize one illumination source to provide illumination to the large FOV 150 and a different illumination source to provide illumination to the small FOV. As described herein, the large FOV 150 may be referred as a first FOV, and the small FOV 155 may be referred to as a second FOV. Additionally, the system may be configured to capture first image data of the first FOV, and second image data of the second FOV. The first image data may have a lower resolution density than the second image data, and the second FOV may be a subregion of the first FOV. As such, first image data may be low resolution image data, and the first FOV may also be considered as a large FOV, second image data may be high resolution image data, and the second FOV may be considered to be a small FOV that is small than the large FOV. In examples, the first image data may be high resolution image data of the large, or first, FOV, and the second image data of the second FOV may be derived from the high resolution first image data of the first FOV.

The optical imaging assembly 114 is operable to capture one or more images of one or more targets 118 entering and/or being within the large FOV 150 or small FOV 155. The optical imaging assembly 114 may detect or image targets 118 in the large FOV 150 or the small FOV 155, but may only decode or process images in the small FOV 155 of the imaging assembly, with the small FOV 155 being a sub-region of one or more FOVs such as the large FOV 150 of the optical imaging assembly 114. While referenced herein as one or more targets 118, a target 118 may also be referred to herein as an object of interest, or in short, an object. In embodiments or descriptions herein, the target 118, or object of interest, may include one or more product codes 120 or indicia indicative of information associated with the target 118.

In practice, the target 118, depicted as a bottle in the example shown, is swiped past the bi-optic imager 106. While illustrated as a single target in FIG. 1A for simplicity and clarity, it is envisioned that the bottle represents multiple targets 118 to be imaged by the optical imaging assembly 114, and that the multiple targets 118 may be within the large FOV 150 of the optical imaging system 114 simultaneously or nearly simultaneously. In doing so, one or more product codes 120 associated with the targets 118 are positioned within the FOV of the optical imaging assembly 114. In the example shown, the product code 120 is a bar code. However, the product code 120 may alternatively be a radio-frequency identification (RFID) tag and/or any other product identifying code. In examples, the target 118 may be in the large FOV 150 of the optical imaging system 114 and the product code 120 may specifically be in a sub-region of the large FOV 150 with the sub-region being the small FOV 155 for decoding indicia of the product code 120. In examples, more than one product code 120 may be present and imaged in the small FOV 155.

In response to capturing the one or more images (e.g., image data), in an example, the processor 116 processes the image data to determine an absence, a presence, movement, etc. of the targets 118 within and/or relative to the large FOV 150 and/or small FOV 155. Specifically, the processor 116 processes the image data in real time to determine when one or more of the targets 118 enters the large FOV 150 or small FOV 155 of the optical imaging assembly 114, when one or more targets 118 are within the large FOV 150 and/or small FOV 155 of the optical imaging assembly 114, and/or when one or more of the targets 118 exits the large FOV 150 and/or small FOV 155 of the optical imaging assembly 114. The processor may capture an image of the large FOV 150 of the optical imaging assembly 114 and identify the presence of indicia, such as the product code 120, in the image. The processor 116 may then determine if the product code 120 is within the small FOV 155 and may further decode and provide information to a user or another system. If the product code is within the large FOV 150, but is not in the small FOV 155, the processor 116 may not decode the indicia, or the processor may decode the indicia but may not further provide any decoded information to a user or another system for further processing.

In some examples, the optical imaging assembly 114 has a relatively short focal length that allows the foreground in which the one or more targets 118 may be present to be better isolated from the background, thereby allowing for the targets 118 to be more easily identified and/or tracked within the large FOV 150 and/or small FOV 155. In some examples, processing the one or more images allows the processor 116 to identify an object that is moving in the large FOV 150 and small FOV 155 and to identify an object that is not moving in the large FOV 150 and/or small FOV 155. The processing may also allow the processor 116 to differentiate between a larger item(s) and a smaller item(s), a direction that the targets 118 are moving within the large FOV 150 and small FOV 155, etc.

In an example, when one or more of the targets 118 are detected entering or being within the large FOV 150 or small FOV 155, the processor 116 initiates an identification session during which one or more product codes 120 carried by the targets 118 can be read/identified. The one or more product codes 120 may be decoded if they are imaged in, or pass through, the small FOV 155 within the large FOV 150. The identification session may be defined as a sequence of activation events such as the activation of the optical imaging assembly 114 as described herein. In some examples, the processor 116 compares the one or more images captured by the optical imaging assembly 114 to preceding ones of the one or more images to detect one or more of the targets 118 entering the large FOV 150 or being in the large FOV 150, or entering or being in the small FOV 155.

In examples, the system may be configured to enter a sleep mode which may power down certain components, or reduce the speeds of a processor. For example, in a sleep mode, an illumination source may be configured to emit at a lower intensity as to allow the system to detect an object in a FOV, but not to provide high illumination for performing decoding of indicia in the FOV. Once an object is detected in an FOV, the system may then switch to an active or scanning mode wherein the processors and imaging devices are configured to image objects and perform decoding of indicia and machine vision processes. In implementations, the system may determine if an object is in a large field of view such as the large FOV 404. If the system determines that an object is not present in the large FOV 404, the system may enter a sleep mode. If the system then detects an object in the large FOV 404, outside of the small FOV 410 the system may then enter the scan mode to actively perform machine vision processes and indicia decoding.

The processor 116 may be configured to perform machine vision processes to identify the one or more targets 118 based on at least a size of the targets 118, a color of the targets 118, a shape of the targets 118, a feature of the targets 118, a logo displayed on the targets 118, etc. In some examples, identifying the product code 120 includes successfully decoding symbology associated with the targets 118. However, if the targets 118 are detected exiting the large FOV 150, or small FOV 155, and/or entering and exiting the large FOV 150 or small FOV 155 without the product code 120 being identified, the processor 116 may generate an alert indicative of the targets 118 not being scanned. Such an approach may be advantageous in detecting an individual (e.g., the clerk 108) attempting to avoid scanning the targets 118, which may be referred to as the act of "scan avoidance."

After the processor 116 terminates the identification session, in an example, the processor 116 prevents a subsequent identification session from being initiated until one or more targets 118 are detected existing in the large FOV 150 and/or small FOV 155 of the optical imaging assembly 114. To allow the processor 116 to track the position and/or the movement of the targets 118 within the large FOV 150 or small FOV 155 and/or to identify the targets 118 within the large FOV 150 or small FOV 155, in some examples, the processor 116 determines a background region that does not contain any objects or product codes 120. The processor may then remove the background region 127 or otherwise filter the background region 127 from image data and may prevent the background region from displaying any image on a user display. As such, the processor 116 may further control the image data of thew small FOV 155 or digitally filter the large FOV 150 of the optical imaging assembly 114 to a three-dimensional space including the entirety of the large FOV 150 of the optical imaging assembly 114, or to a reduced three-dimensional, or two-dimensional volume, being a subset of space within the large FOV 150 of the optical imaging assembly 114.

The housing 112 includes a lower housing 124 and a raised housing 126. The lower housing 124 may be referred to as a first housing portion and the raised housing 126 may be referred to as a tower or a second housing portion. The lower housing 124 includes a top portion 128 with a first optically transmissive window 130. The first window 130 is positioned within the top portion 128 along a generally horizontal plane relative to the overall configuration and placement of the bi-optic imager 106. In some embodiments, the top portion 128 may include a removable or a non-removable platter (e.g., a weighing platter). The top portion 128 can also be viewed as being positioned substantially parallel with the counter 104 surface. As set forth herein, the phrase "substantially parallel" means +/−10° of parallel and/or accounts for manufacturing tolerances. It's worth noting that while, in FIG. 1, the counter 104 and the top portion 128 are illustrated as being about co-planar, that does not have to be the case for the platter and the counter 104 to be considered substantially parallel. In some instances, the counter 104 may be raised or lowered relative to the top surface of the top portion 128, where the top portion 128 is still viewed as being positioned substantially parallel with the counter 104 surface. The raised housing 126 is configured to extend above the top portion 128 and includes a second optically transmissive window 132 positioned in a generally upright plane relative to the top portion 128 and/or the first window 130. Note that references to "upright" include, but are not limited to, vertical. Thus, as an example, something that is upright may deviate from a vertical axis/plane by as much as 45 degrees.

The optical imaging assembly 114 includes the image sensor(s) that is configured to digitally read the product code 120 through at least one of the first and second windows 130, 132 to detect and decode indicia at various positions and orientations within the large and small FsOV 150 and 155 of the imaging assembly 114, and to perform machine vision processes using image data of the large FOV 150. In an example, identifying the position of the target 118 through the first and second windows 130, 132 using the optical imaging assembly 114 allows for a virtual three-dimensional (3D) image of the swipe path of the target 118 through the large FOV 150 to be identified. The swipe path may include a diagonal swipe path. In addition to monitoring the swipe path, the processor 116 may process the one or more images captured by the optical imaging assembly 114 to track behavior of the clerk 108 including, for example, how the target 118 is held, the swipe direction most followed, etc. Further, the swipe path may be monitored to determine if a given target 118 has already been scanned and/or identified to prevent a re-decoding of a previously decoded product code 120. While the above-example illustrates tracking a single target 118, in other examples, more than one target swipe path may be tracked.

Figure 2:
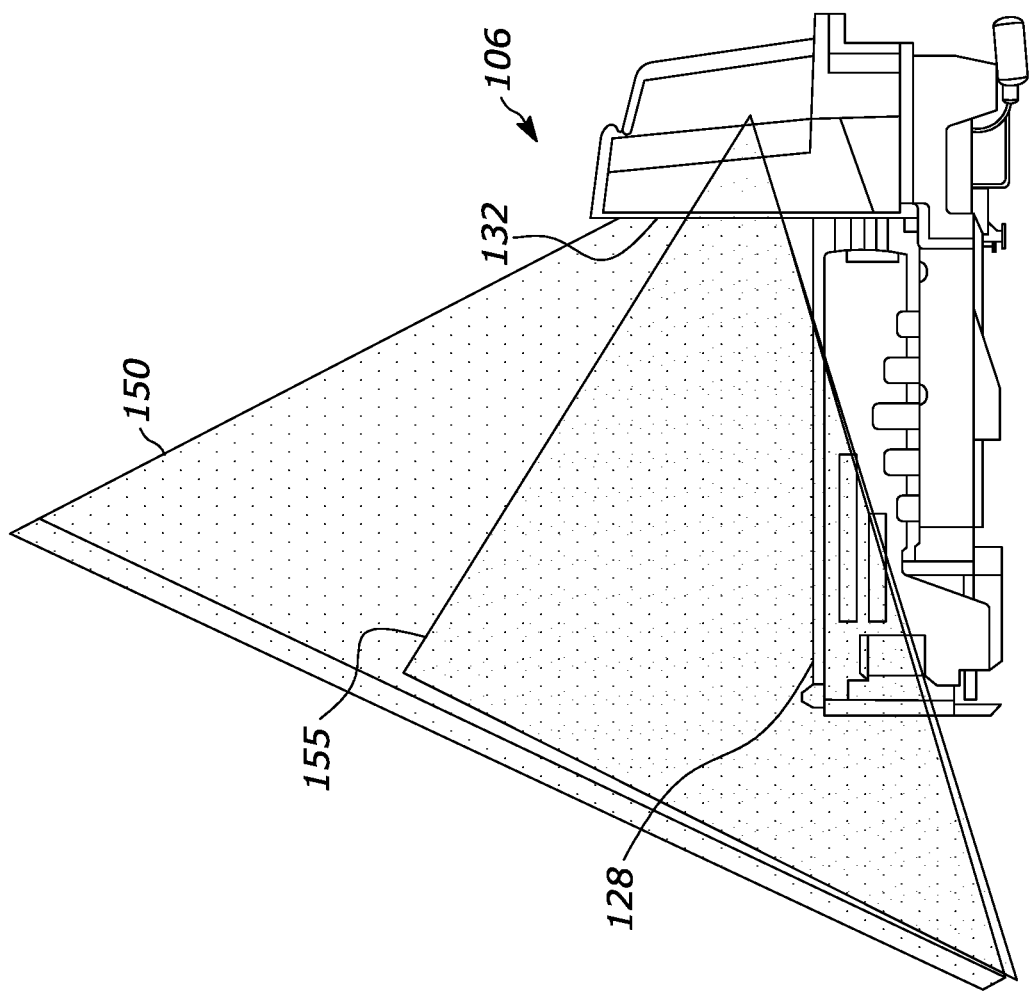
FIG. 2 illustrates a side view of a large field of view (FOC) and small FOV projecting from an example of the bi-optic imager of FIG. 1A.
Figure 3:
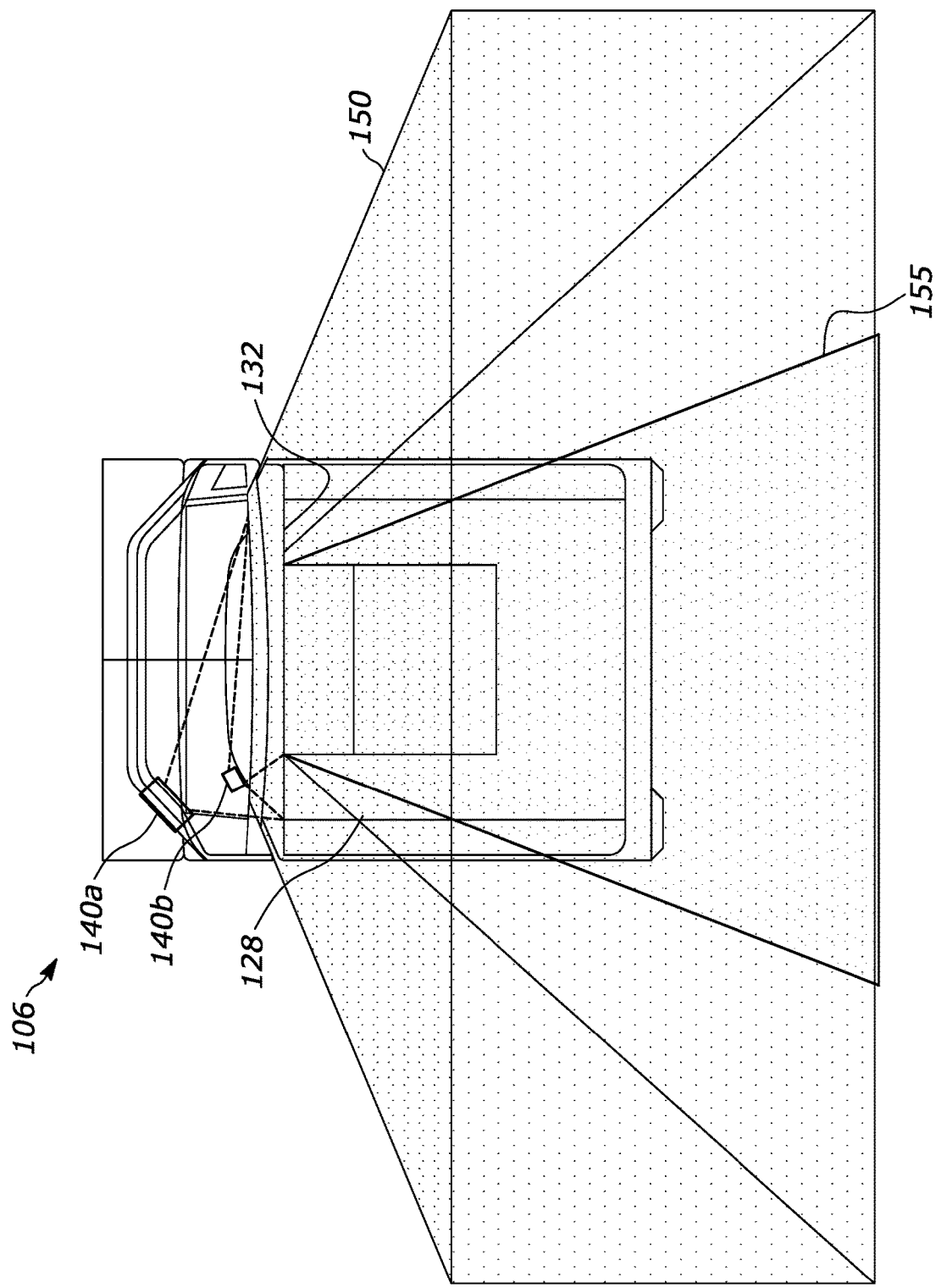
FIG. 3 illustrates a top-down view of the large FOV and the small FOV projecting from bi-optic imager of FIG. 1A.

FIG. 2 illustrates a side view of the large FOV 150 and small FOV 155 projecting from the second window 132 of another example of the bi-optic imager 106 of FIG. 1A. FIG. 3 illustrates a top-down view of the large FOV 150 and the small FOV 155 projecting from the second window 132 on the bi-optic imager 106 of FIG. 1A.

In examples, the bi-optic imager 106 may be configured to capture high-resolution image data of the small FOV 155 for performing barcode and/or indicia decoding. The bi-optic imager 106 may further be configured to obtain low-resolution images of the large FOV 150 for performing machine vision processes. Obtaining high-resolution image data of the reduced size small FOV 155 allows for a number of image pixels per module (PPM) as required for performing barcode and indicia decoding. Machine vision processes may not require such high PPM resolutions which allows for the low-resolution image data of the larger FOV 150 to be processed and used for machine vision processes. In examples, the bi-optic imager 106 may be configured to obtain one or more high-resolution images of the large FOV 150. A processor may then determine the small FOV 155 as a subset of image data in the high-resolution images, and the processor may then generate high-resolution images or image data of the small FOV 155 from the high-resolution images of the large FOV 150.

FIG. 2 illustrates an example bi-optic imager 106 having multiple illumination sources including a large FOV illumination source 140a and a small FOV illumination source 140b. The two illumination sources are configured to provide different illumination fields to the large and small FsOV 150 and 155. For example, the large FOV illumination source 140a provides a wider and overall larger illumination field to respectively cover all of, or a majority of, the large FOV 150, whereas the small FOV illumination source 140b provides more focused illumination to cover the small FOV 155. As such, the small FOV illumination source 140b may also provide brighter illumination to the small FOV 155 to allow for adequate illumination of a barcode or other indicia imaged in the small FOV 155 to increase the contrast of the barcode or indicia. In the illustrated example, the small FOV illumination source 140b is disposed closer to the second optically transmissive window 132 to prevent or reduce reflections off of the second optically transmissive window back into the raised housing 126. The larger FOV illumination source 140a may be disposed further into the raised housing 126 to allow for the illumination of the entire, or substantially entire, large FOV 155, with substantially even illumination across the large FOV 155.

Figure 4A:
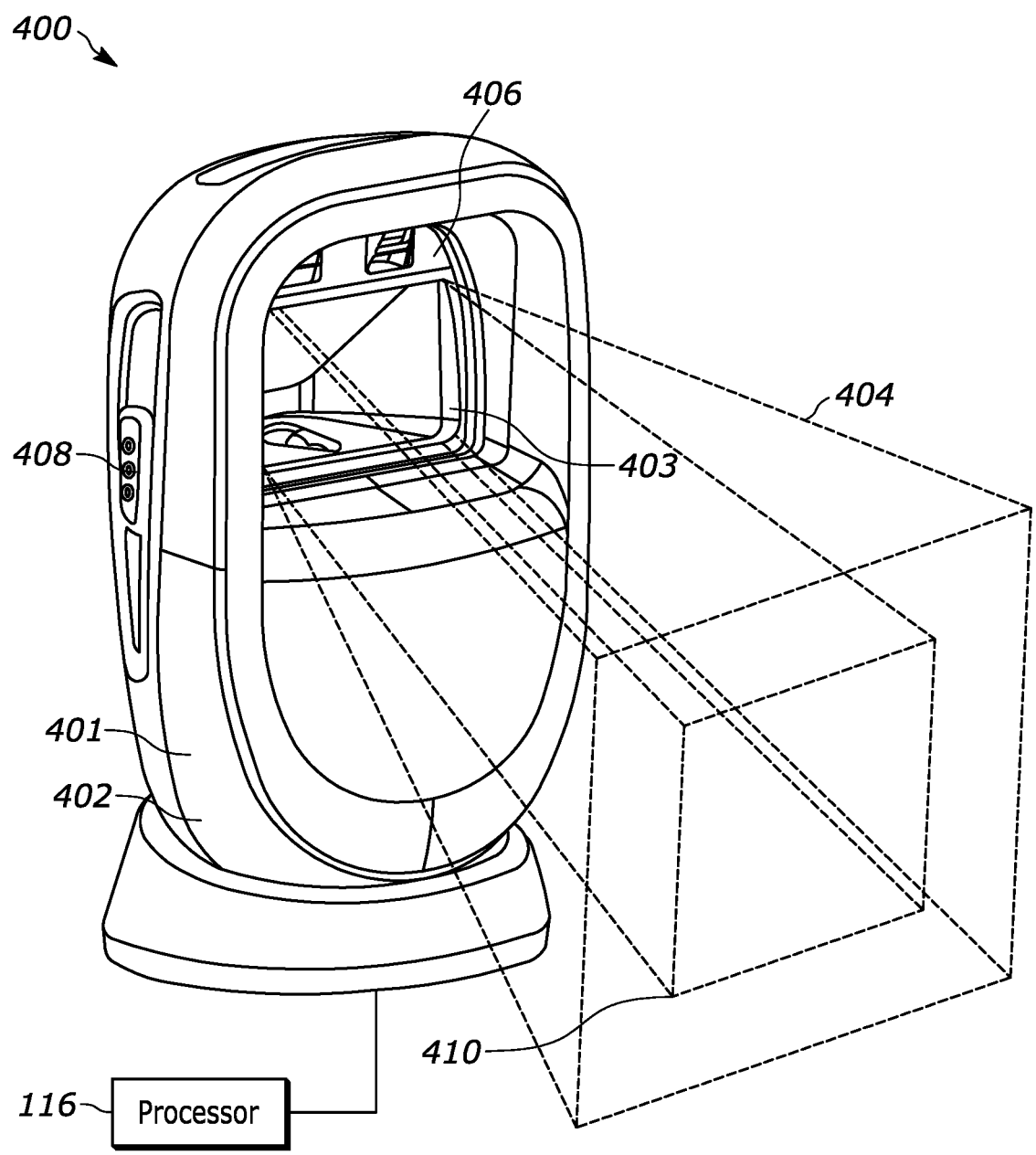
FIG. 4A illustrates an example scanner in accordance with the teachings of this disclosure.
Figure 4B:
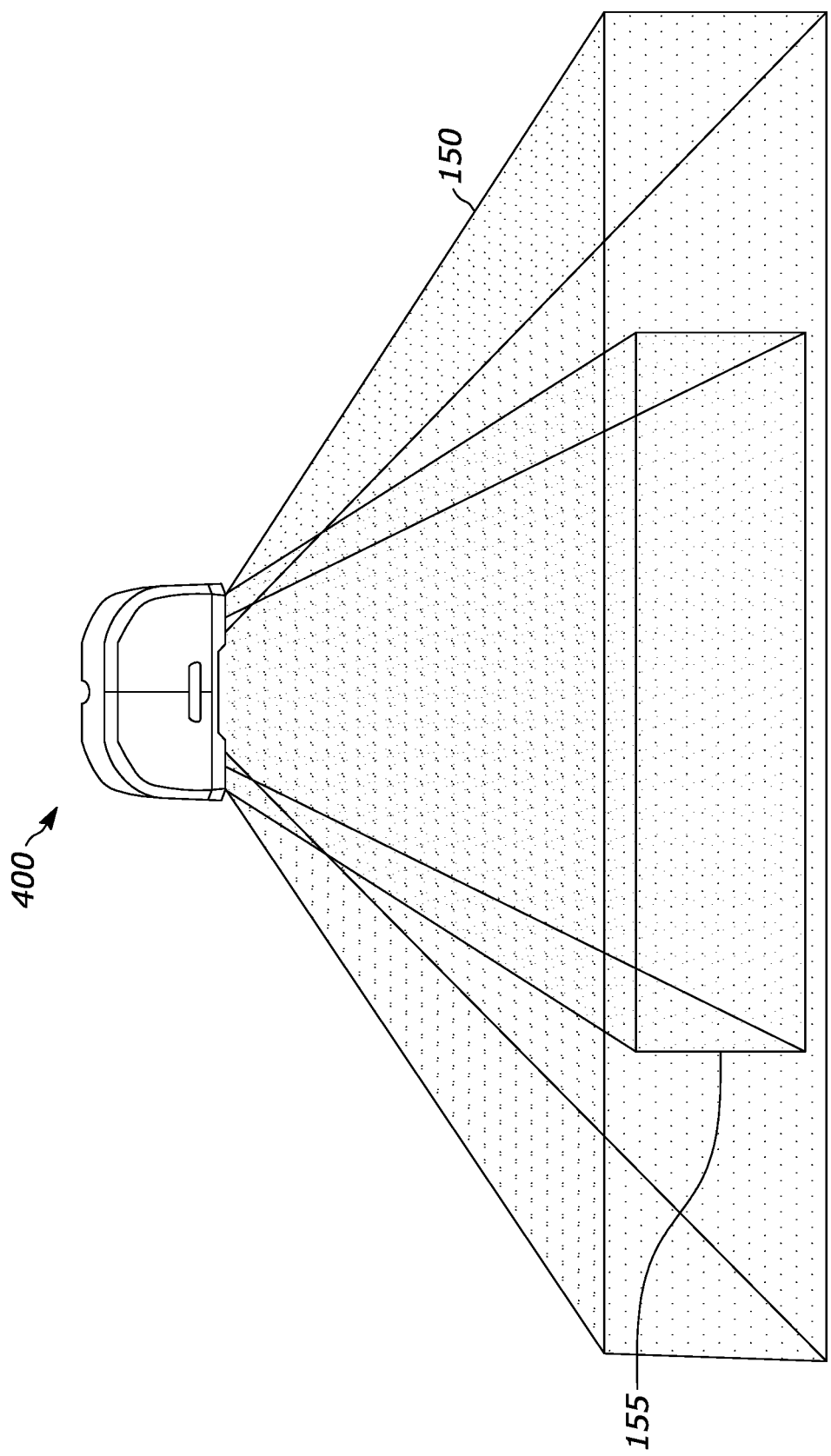
FIG. 4B illustrates a top down view of the scanner of FIG. 4A, in accordance with the teachings of this disclosure.

FIG. 4A illustrates a perspective view of another example scanning device 400 in accordance with the teachings of this disclosure. The scanning device 400 may be referred to as an indicia reader, and the scanning device may be handheld to move around a target to scan indicia or the scanning device 400 may be stationary, for example, free standing on a countertop. In the example shown, the scanning device 400 includes a housing 401 having a handle or a lower housing portion 402 and an optical imaging assembly 403. The optical imaging assembly 403 is at least partially positioned within the housing 401 and has a large FOV 404 and a small FOV 410. The scanning device 400 also includes an optically transmissive window 406 and a trigger 408. The optical imaging assembly 403 may include one or more image sensors that may include a plurality of photo-sensitive elements (e.g., visible photodetectors, infrared photodetectors or cameras, a color sensor or camera, etc.). The photo-sensitive elements may be arranged in a pattern and may form a substantially flat surface. For example, the photo-sensitive elements may be arranged in a grid or a series of arrays forming a 2D surface. The image sensor(s) of the optical imaging assembly 403 may have an imaging axis that extends through the window 406.

To operate the scanning device 400, a user may engage the trigger 408 causing the scanning device 400 to capture an image of a target, a product code, or another object. Alternatively, in some examples, the scanning device 400 may be activated in a presentation mode to capture an image of the target, the barcode, or the other object. In presentation mode, the processor 116 is configured to process the one or more images captured by the optical imaging assembly 403 to identify a presence of a target, initiate an identification session in response to the target being identified, and terminate the identification session in response to a lack of targets in the FOV 404.

The small FOV 410 that is a sub-region of the FOV 404. The scanning device 400 may image a target in the small FOV 410 and the scanning device identifies and decodes indicia imaged in the small FOV 410. The scanning device 400 also may further process decoded information of the indicia and provide information associated with the indicia to a user (e.g., via a user interface, monitor, tablet computer, handheld device, etc.) if the indicia is imaged within the small FOV 410. If the indicia is imaged in the large FOV 404, outside of the small FOV 410, the processor may not decode the indicia. In examples where the indicia is imaged in the large FOV 404, the processor may decode information associated with the indicia, but may not further provide the information to a user or another system for further processing. Additionally, the processor may perform machine vision operations on objects and targets imaged in the large FOV 404.

Figure 5:
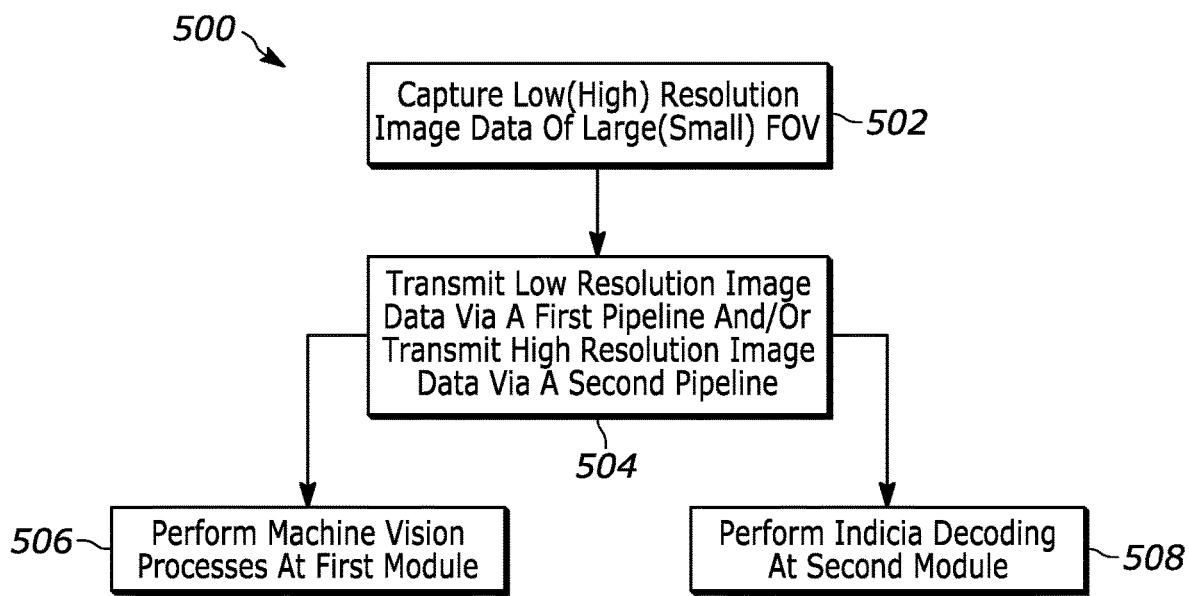
FIG. 5 illustrates a flowchart for a method for performing barcoding and machine vision processes using a single camera.

FIG. 5 illustrates a flowchart for a method for performing barcoding and machine vision processes using a single camera. The method of FIG. 5 may be implemented by the bi-optic imager 106 of FIGS. 1 through 4. A process 500 begins at block 502 with an imaging sensor capturing image data of either the large FOV 150 or image data of the small FOV 155. The imaging sensor may include a single imaging camera. In examples, the imaging camera may have a resolution of 5 megapixels or greater, or 7 megapixels or greater. The imaging camera may capture high-resolution image data of the small FOV 150, may capture high-resolution image data of the large FOV 150, and/or capture low-resolution image data of the large FOV 150. In specific examples, the imaging camera captures at least one of a high-resolution image data of the small FOV 155 or a low-resolution image data of the large FOV 150, with the small FOV 155 being a subset of the large FOV 150.

At block 504, a processor transmits the captured low-resolution image data of the large FOV 150 via a first pipeline to a first module and/or the captured high-resolution image data of the small FOV 155 via a second data pipeline to a second module. The first and second pipelines may include one or more wired connections, wireless connections, network interfaces, input/output interfaces, data busses, etc. The first pipeline may be configured to transmit the low-resolution image data which may include having a certain bandwidth, latency, etc. The second pipeline may be configured to transmit the high-resolution image data with may include having a certain bandwidth, latency, etc. Transferring high-resolution image data and low-resolution image data via separate pipelines may allow for concurrent transfer of image data for performing indicia decoding and machine vision processes simultaneously or nearly simultaneously. In some implementations, the first and second data pipelines may share same, or partially share same resources. For example, the first and second data pipelines may both utilize a same physical data bus with the bus configured to provide the high-resolution data to a second module and the low resolution to a first module. Additionally, the first and second data pipelines may be either logical or physical pipelines. The first and second modules may be implemented via one or more processors. In examples, processes of the first and second modules may be performed by a same processor, or by different processors. In examples, the first and second modules may be implemented by shared recourses.

At block 506, the first module performs image processing and analysis on the low-resolution image data. The first module may be configured to perform non-barcode decoding machine vision operation processes from the low-resolution image data. For example, the first module may be configured to perform object detection, object recognition, facial recognition, background detection, scan avoidance processes, environment mapping, tracking of an objects trajectory, surface mapping, surface detection, or another machine vision process.

At block 508, the second module performs image processing and indicia decoding on the high-resolution image data. The first module may perform detection and decoding of a barcode, a QR code, a 1D barcode, a 2D barcode, a 3D barcode, or another indicia for decoding. Additionally, the second module may perform other operations such as optical character recognition, symbol recognition, or another type of object or indicia recognition or decoding.

In examples, the first and second modules may be executed by a single processor, or the first and second modules may each be performed by independent dedicated processors. Additionally, a first processor may transmit the low-resolution image data via the first pipeline to a machine vision processor for performing the machine vision processes, and the first processor may transmit the high-resolution image data via the second pipeline to a decoding processor for performing the indicia decoding.

Figure 6:
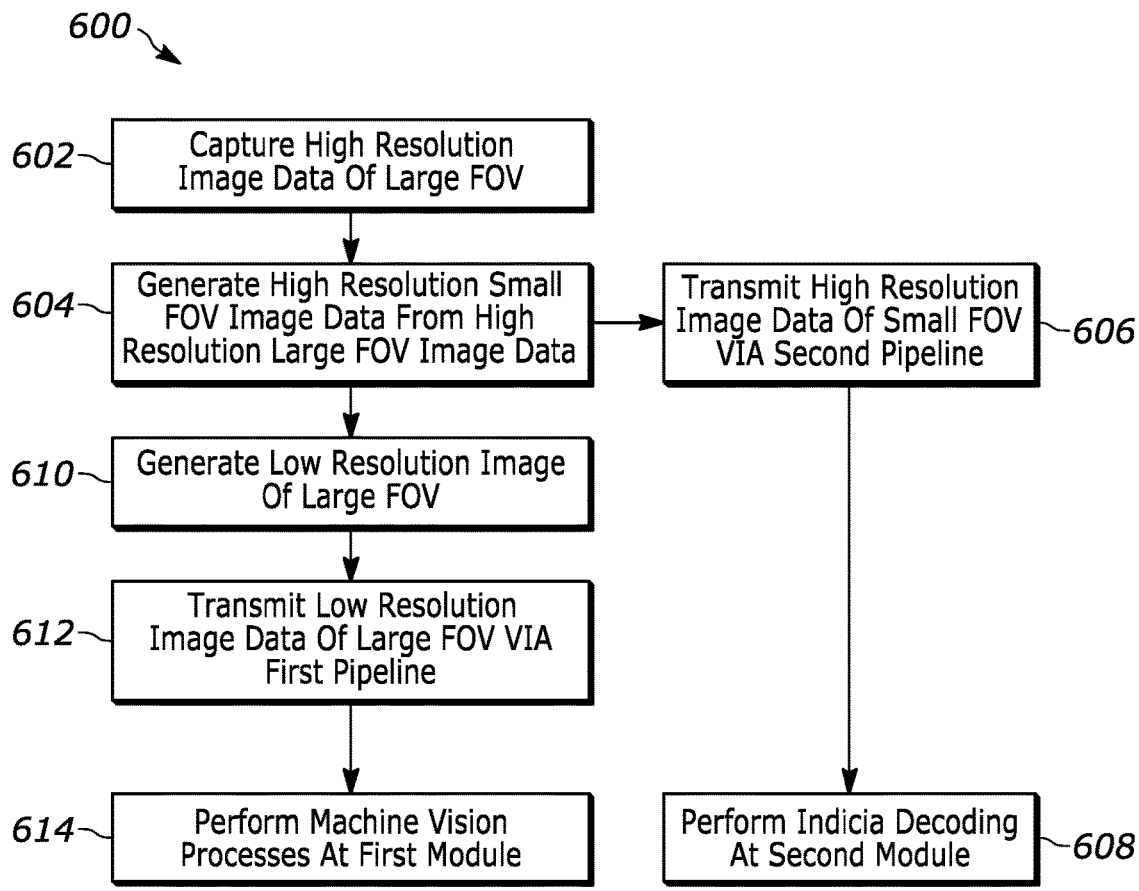
FIG. 6 illustrates a flowchart of another method for performing barcoding and machine vision processes using a single camera.

FIG. 6 illustrates a flowchart of another method for performing barcoding and machine vision processes using a single camera. The method of FIG. 6 may be implemented by the bi-optic imager 106 of FIGS. 1 through 4. A process 600 begins at block 602 with an imaging sensor capturing high-resolution image data of the large FOV 150. The imaging sensor may include a single imaging camera. In examples, the imaging camera may have a resolution of 5 megapixels or greater, or 7 megapixels or greater.

At block 604 a processor generates a high-resolution image data of the small FOV 155 from the high-resolution image data of the large FOV 150. The processor may determine the high-resolution image data of the small FOV 155 by cropping, data omission, subsampling, etc. After the high-resolution image data of the small FOV 155 is generated, at block 606 the processor transmits the high-resolution image data of the small FOV 155 via a second data pipeline to a second module. At block 608 the second module performs indicia decoding from the high-resolution image data of the small FOV 155.

At block 610 the processor may further perform image processing on the high-resolution image data of the large FOV 150 to generate low-resolution image data of the large FOV 150. For example, the processor may generate the low-resolution image data of the large FOV 150 via sampling of the high-resolution image data of the large FOV 150, or by another means. The processor may perform binning on the high resolution image data to bin down the image data to generate the low-resolution image data of the large FOV 150. Additionally, the low-resolution image data of the large FOV 150 may be generated by an image sensor instead of a dedicated processor. At block 612, the processor transmits the low-resolution image data of the large FOV 150 via a first data pipeline to a first module. The first module then performs machine vision processes using the low-resolution image data of the large FOV 150 at block 614.

Figure 7A:
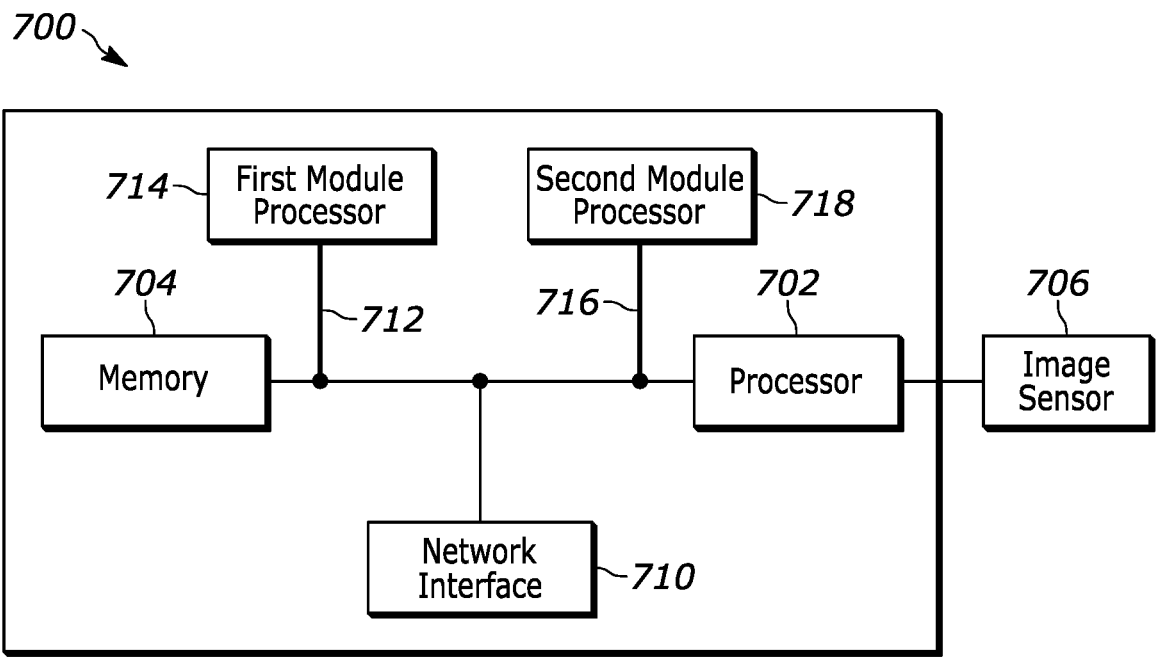
FIG. 7 is a block diagram representative of an example processor platform capable of implementing, for example, one or more components of the example systems and methods for performing barcoding and machine vision processes using a single camera.

FIG. 7A is a block diagram representative of an example processor platform 700 capable of implementing, for example, one or more components of the example systems for performing barcoding and machine vision processes using a single camera. The processor platform 700 includes a processor 702 and memory 704. In the example shown, the processor is coupled to a first image sensor 706, which may be a single camera for performing indicia capture and decoding as well as for machine vision processes. The processor platform 700 and/or the image sensor 706 may be used to implement the system 100 of FIG. 1 and/or the bi-optic imager 106 of FIGS. 1-4.

The memory 704 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The memory (e.g., volatile memory, non-volatile memory) 704 accessible by the processor 702 (e.g., via a memory controller). The example processor 702 interacts with the memory 704 to obtain, for example, machine-readable instructions stored in the memory 704 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 700 to provide access to the machine-readable instructions stored thereon.

The example processing platform 700 of FIG. 7A also includes a network interface 710 to enable communication with other machines via, for example, one or more networks. The example network interface 710 includes any suitable type of communication interface(s) (e.g., wired and/or wireless interfaces) configured to operate in accordance with any suitable protocol(s). Each of the processor 702, memory 704, and network interface 710 may be in communication via various wired or wireless means such as via a bus, to transfer data and information between the processor 702, memory 704, and the network interface 710.

The example processing platform 700 further includes a first data pipeline 712 that provides communication to a first module processor 714, and a second data pipeline 716 that provides communication with a second module processor 718. The first and second data pipelines 712 and 716 are dedicated communication channels to each of the respective first and second module processors 714 and 718. The first and second data pipelines 712 and 716 may be a wire or wireless communication channel. The first data pipeline 712 may be configured to transfer low-resolution image data to the first module processor 714. The first module processor 714 may be configured to perform image processing and additional data processing for performing machine vision operations. In examples, the first module is not configured to perform indicia decoding, or to transmit information and image data associated with indicia decoding to a processor or host for indicia decoding. The second data pipeline 716 may be configured to transmit high-resolution image data to the second module processor 718. The second module processor 718 may be configured to perform image processing for barcoding and indicia decoding operations. While illustrated as two independent processors, the barcoding/indicia decoding and machine vision processes may be performed by a single module processors capable of receiving both the low-resolution image data and the high-resolution image data and performing the associated processes and operations. For example, the first and second modules described in the methods and systems herein may be executed by a single host processor while the processor 702 may further obtain and transmit the high and low-resolution image data from the image sensor 706. Additionally, the processor 702 may perform additional image processing to crop, subsample, upsample, perform pixel averaging, distort, or perform additional processes on image data obtained from the image sensor 706, the memory 704, or the network interface.

Figure 7B:
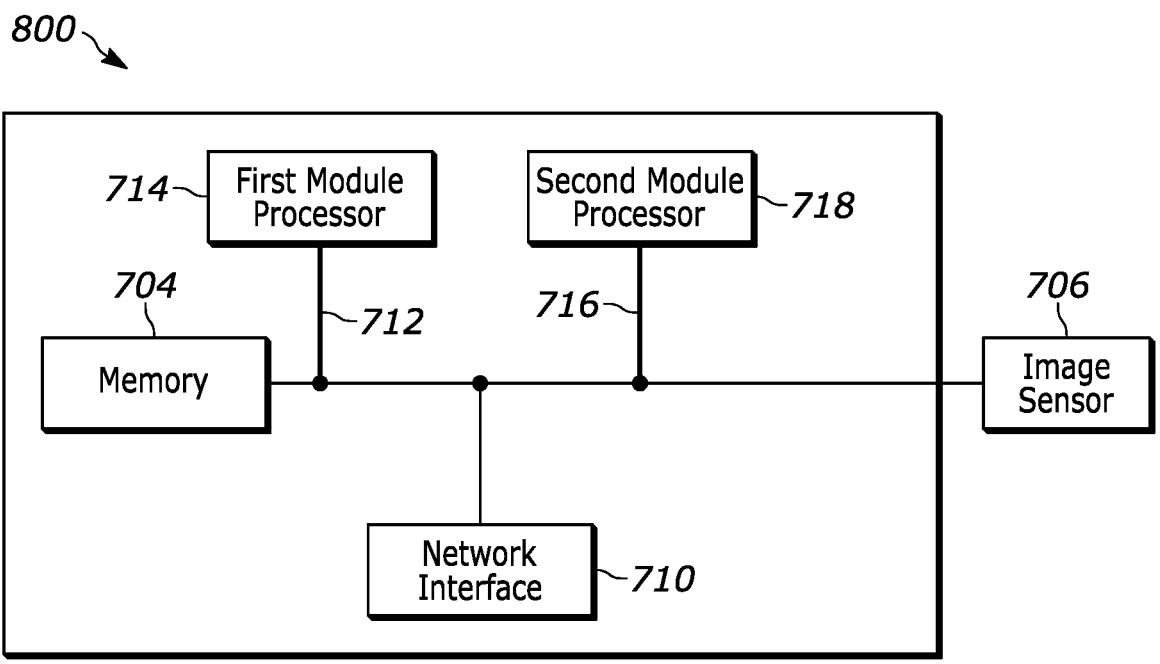

FIG. 7B provides an illustration of a block diagram representative of an example processor platform 800 capable of implementing one or more components of the example systems for performing barcoding and machine vision processes using a single camera. The system of FIG. 7B illustrates an embodiment of a similar platform 800 to the platform 700 of FIG. 7A, wherein the image sensor 706 of the platform 800 provides image data directly to the first and second modules 714 and 718 via the first and second pipelines 712 and 716 without the processor 702 of FIG. 7A.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia decoding and/or machine vision system, the system comprising:
   an image processing assembly configured to capture (i) first image data over a first field of view of the image sensor with the first image data having a first resolution and (ii) second image data of a second field of view of the image sensor, the first field of view being larger than the second field of view, and the first resolution having a lower resolution density than the second resolution;
   a first data pipeline configured to transmit the first image data from the image sensor to a first module configured to perform image processing on the first image data;
   a second data pipeline configured to transmit the second image data from the image sensor to a second module configured to perform image processing on the second image data; and
   a processor and computer-readable media storage having machine readable instructions stored thereon that, when the machine readable instructions are executed, cause the system to:
      capture, via the image sensor, image data of either of the first field of view or of the second field of view of the image sensor; and
      responsive to capturing image data, transmit either the first image data via the first data pipeline to the first module or the second image data via the second data pipeline to the second module.

2. The system of claim 1, wherein the image sensor is further configured to capture high resolution density image data of the first field of view, and wherein the machine readable instructions further cause the system to:
  generate, by the processor, high resolution density image data of the second field of view from the high resolution density image data of the first field of view; and
  transmit, by the processor, the generated high resolution density image data of the second field of view via the second data pipeline to the second module.

3. The system of claim 1, wherein the first module and second module are executed by a host processor communicatively coupled to the processor through the first data pipeline and the second data pipeline.

4. The system of claim 1, wherein the first module is configured to perform non-barcode decoding machine vision operation processes on the first image data.

5. The system of claim 4, wherein the second module is configured to perform indicia decoding on the second image data.

6. The system of claim 4, wherein the first module is configured to perform object detection, object recognition, or facial recognition on the low-resolution image data.

7. The system of claim 1, further comprising one or more illumination sources configured to provide (i) a first illumination to the first field of view, and (ii) a second illumination to the second field of view.

8. The system of claim 1, wherein the machine readable instructions further cause the system to:
  determine if an object is in the large field of view;
  responsive to a determination that an object is not present in the large field of view, cause the system to enter a sleep mode;
  detect an object in the large field of view outside of the small field of view; and
  cause the system to enter a scan mode.

9. The system of claim 1, wherein the first module is not configured to perform at least one of decoding indicia or to transmit the indicia to a host for performing indicia decoding.

10. A method for performing single camera indicia decoding and machine vision processes, the method comprising:
  capturing, via an imaging sensor, first image data of a first field of view of the imaging sensor or second image data of a second field of view of the imaging sensor, the second field of view being a subset of the first field of view, and the first image data having a lower resolution density than the second image data; and
  transmitting, by a processor, either of (i) the first image data of the first field of view via a first data pipeline to a first module, or (ii) the second image data of the second field of view via a second data pipeline to a second module.

11. The method of claim 10, further comprising:
  capturing high resolution density image data of the first field of view;
  generating high resolution density image data of the second field of view from the first image data of the first field of view; and
  transmitting the generated high resolution density image data of the second field of view via the second data pipeline to the second module.

12. The method of claim 10, wherein the first module and second module are executed by a host processor communicatively coupled to the processor through the first data pipeline and the second data pipeline.

13. The method of claim 10, wherein the first module is configured to perform non-barcode decoding machine vision operation processes.

14. The method of claim 13, wherein the second module is configured to perform indicia decoding.

15. The method of claim 10, wherein the first module is configured to perform object detection, object recognition, or facial recognition.

16. The method of claim 10, further providing via one or more illumination sources (i) a first illumination to the first field of view, and (ii) a second illumination to the second field of view.

17. The method of claim 16, wherein the first illumination and second illumination are provided by different illumination sources.

* * * * *